(12) United States Patent
Chen et al.

(10) Patent No.: US 6,658,482 B1
(45) Date of Patent: Dec. 2, 2003

(54) METHOD FOR SPEEDING UP INTERNET PROTOCOL ADDRESS LOOKUPS WITH EFFICIENT USE OF MEMORY

(75) Inventors: Wen-Shyen Eric Chen, 250 Kuo-Kuan Rd., Taichung (TW); Chung-Ting Justine Tsai, Taipei (TW)

(73) Assignee: Wen-Shyen Eric Chen, Taipei (TW)

( * ) Notice: Subject to any disclaimer, the term of this patent is extended or adjusted under 35 U.S.C. 154(b) by 0 days.

(21) Appl. No.: 09/454,549

(22) Filed: Dec. 7, 1999

(30) Foreign Application Priority Data

Feb. 8, 1999 (TW) ........................................ 88101917 A

(51) Int. Cl.[7] ............................................. G06F 15/16
(52) U.S. Cl. ........................................ 709/245; 709/238
(58) Field of Search ................................ 709/245, 200, 709/201, 220, 221, 224, 238; 707/10

(56) References Cited

U.S. PATENT DOCUMENTS

| | | | | |
|---|---|---|---|---|
| 6,018,524 A | * | 1/2000 | Turner et al. ............... | 370/392 |
| 6,052,683 A | * | 4/2000 | Irwin ........................... | 707/8 |
| 6,061,712 A | * | 5/2000 | Tzeng ......................... | 709/202 |
| 6,067,574 A | * | 5/2000 | Tzeng ......................... | 707/101 |
| 6,266,706 B1 | * | 7/2001 | Brodnik et al. ............. | 370/238 |
| 6,385,649 B1 | * | 5/2002 | Draves et al. .............. | 709/224 |

OTHER PUBLICATIONS

P.Gupta, S.Lin, and N. McKeown. "Routing Lookups in Hardware at Memory Access Speeds." In Proceedings of Infocom '98 , San Francisco, 1998.*

* cited by examiner

Primary Examiner—Krisna Lim
Assistant Examiner—Mareisha N. Winters
(74) Attorney, Agent, or Firm—Dickinson Wright PLLC

(57) ABSTRACT

The method includes the following steps: First, establishing two Prefix Information Tables (PITs), PIT-m and PIT-n, for partitioning the Trie into several segments to map into all IP addresses in the Internet. Then looking up a Best Matching Prefix (BMP) for the Internet Protocol address through the PIT-m and the PIT-n for finding an output port or for finding the Lookup Table (LT) corresponding to the IP address. Finally, checking up the LT for finding the BMP, and the exact output port is thus obtained.

3 Claims, 5 Drawing Sheets

An Index to Output Port

| Entry Number | I | P | Output Port |

An Index into Lookup Table

| Entry Number | I | P | Index Into Lookup Table |

METHOD FOR SPEEDING UP INTERNET PROTOCOL ADDRESS LOOKUPS WITH EFFICIENT USE OF MEMORY

BACKGROUND OF THE INVENTION

1. Field of the Invention

The present invention relates to a method for Internet Protocol address lookups with efficient use of memory, more particularly, to a method for speeding up Internet Protocol address lookups by constructing Prefix Information Tables to represent the information on the routing table in the router.

2. Background of the Invention

The speed of conventional Internet Protocol (IP) lookup in the routers has become unsatisfactory owing to the dramatically increased traffic flow in the Internet, and comparable bandwidths needed. To find the output port for a destination address indicated by a packet sent in a router, the Internet router has to look up for the longest matching prefix, which is called Best Matching Prefix (BMP), for the destination address. But in prior art, the Internet Protocol lookup schemes are complicated and need lots of time to locate the BMP, and thus form a bottleneck on the Internet. In the present invention, a brand new scheme for IP lookups is introduced, which is capable of enhancing the speed of the IP lookups efficiently. The main concept behind the scheme is grounded upon two Prefix Information Tables (PITs), which are respectively the PIT at level m, and the PIT at level n. The two PITs partition the conventional binary tree expanded by the routing table into segments. Next comes with a matching process for the IP address needed to be routed by the router in the PIT at level m or/and the PIT at level n to find the segment the IP address locates on the binary tree. Once the segment on the binary tree is decided, either the output port for the destination address is found or the Lookup Table is addressed. In the Lookup Table addressed, a matching process for the destination address is to be conducted to locate the BMP, and thus the output port is known through the Lookup Table.

In this invention, there needs only 1 hash plus 2 memory accesses for the worst cases. In an IPv4 backbone router with 41,000 routing entries, there needs, on an average, 0.53 hashes plus 1.4 memory accesses. With the use of 50 ns SDRAM, the scheme offers a lookup speed up to 10 millions packets per second. Furthermore, the lookup speed can be improved linearly with the speedup of the memory used. Additionally, the update to the routing table is easy and is low on the overhead and the memory needed for the forwarding table is only about 0.6 MBytes. The scheme and the advantages the scheme offers mentioned above can efficiently settle the problems occurred in prior art on the IP lookup issue.

The Internet Protocol (IP) address lookup scheme in the most primitive work is to put prefixes on a router into hash tables, respectively, based on their lengths. When a packet is sent into the router, a hash process is launched through the prefix hash tables. The hash process goes through from the longest to the shortest prefix hash table. The IP lookup scheme is based on the conventional Trie for the Best Matching Prefix (BMP), which is shown in FIG. 1. In the worse cases, 32 hashes are needed for the IP lookup; in the average cases, over 10 hashes are needed. The speed this scheme performs apparently cannot meet the requirements for the future high-speed routers.

The first prior art in this section is suggested by M. Waldvogel, G. Varghese, J. Turner and B. Plattner, entitled "Scalable High Speed IP Routing Lookups", for IP routing lookups. Compared with the traditional IP lookup based on a Trie, the solution organizes the prefix IP addresses according to their lengths into hash tables (one hash table for each prefix length). Binary search is then used over the hash tables (instead of the routing entries themselves) for the BMP, which is shown in FIG. 2. Coupled with some optimizations, such as Mutating Binary Search, which exploits the traffic characteristics of the Internet, used to further reduce the complexity, the access times of memory, the speed of IP lookups can be further improved.

The binary search is started with putting "markers" into the hash tables at each level. Alternatively, each prefix P of length L has to place markers at all levels shorter than L. The markers indicate that there exist the prefixes of greater lengths in the subtree spanning from the node itself. The scheme starts the hash search at the median length of the Trie and progresses using binary search. If there is a match, all lengths greater than the median (the lower half of the Trie) are searched recursively; otherwise, all lengths less than the median (the upper half of the Trie) are searched instead. Additionally, Mutating Binary Search can be adopted to reduce the time of searching for the BMP; namely, whenever an entry is accessed, the searching proceeds with the subtree expanded from the entry.

In the algorithm, the size of the forwarding table is independent on the time for IP lookups, and the memory access time is in 2-based logarithm relationship with the length of the IP address, and which is advantageous to support for the future IPv6. In this scheme, an average numbers hash processes is 2, and $\log_2$ (the bit number of the IP address) for the worst cases. Since the length of the IP address is 32 bits in the IPv4 backbone, 5 hashes are needed for the worse cases. The approach has the advantages of being scalable (for future IPv6) and reduced IP lookup time. However, the data structures used are complicated and the update of an entry in the routing table might result in a large number of the entries being updates in the lookup table as the markers need to be reentered in tables at every level of the Trie. So making the lookup table update has to rebuild the tree periodically.

Gupta, Lin, and McKeown presented a fast IP routing lookup scheme in the hope of achieving a speed up to a gigabit per second by means of Longest Prefix Matching in hardware process, which is referred to as the second prior art in this section. In the scheme, IP addresses each are divided into two sections, the first 24 bits and the last 8 bits. A table TBL24 is created to accommodate the prefixes with lengths less than or equal to 24 bits. If the first bit is 0, then the other 15 bits is used to indicate the next hop. On the contrary, the first bit is 1, then the other 15 bits stands for a pointer which points to TBLlong, which is created to accommodate the prefixes which are longer than 24 bits. The implemented hardware for the lookup scheme is shown in FIG. 3.

In accordance with this scheme, an average time of 1 (in fact, a little more than 1) memory access is needed, and the maximum number of 2 memory accesses are needed. Although the IP lookups scheme is very efficient in speed, it may call for 33MB DRAM to store data structures needed. The use of memory is instead very inefficient. The scheme is not able to support efficiently the future Internet Protocol scheme, which have address fields of 128 bits. Furthermore, a distributed database management is hard to implemented based on this scheme.

SUMMARY OF THE INVENTION

The present invention is aimed to provide a method for speeding up Internet Protocol (IP) address lookups with efficient use of memory. The lookup process may include the characteristics as follows. First, the lesser time of accessing memory for IP lookups the better. Second, for the worst case, the time of accessing memory must be limited in a range in order to attain the IP lookup speed. Third, in accessing memory, it is preferred to execute with pipelined operation. Last, it is desired to have a smaller size of memory required for data structures. Additionally, it will be better if the data structures used are more concise and compact.

According to one aspect of the present invention, a method for speeding up Internet Protocol address lookups with efficient use of memory is disclosed. The method includes the following steps: First, establishing a Prefix Information Table (PIT), PIT-m, corresponding to a subtree expanding from a node on m-th level on the Trie, and a PIT, PIT-n, corresponding to a subtree expanding from a node on n-th level on the Trie for partitioning the Trie into several segments to map into all IP addresses. Then looking up the Best Matching Prefix (BMP) for the Internet Protocol address through the PIT-m and the PIT-n for finding an output port or for finding the Lookup Table (LT) corresponding to the IP address. Finally, checking up the LT for finding a BMP, and thus an exact output port is obtained. The PIT-m format comprises: an m-bit entry number identification, a 1-bit direction identification, a 1-bit prefix identification, and a 14-bit pointer; and the PIT-n comprises: n-bit entry number identification, 1-bit direction identification, a 1-bit prefix identification, and 14-bit pointer. While in Lookup Tables, there store output ports corresponding to prefix entries. By use of a fraction of an IP address as an index into the Lookup Table, an exact output port can be found.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

In prior art, the lookup approaches either use complicated data structures, resulting in increased complexity while updating the routing entries; or they are not scalable to the future IPv6. In view of this, the present invention proposes a scalable IP lookup mechanism that is memory efficient.

Figure 1:
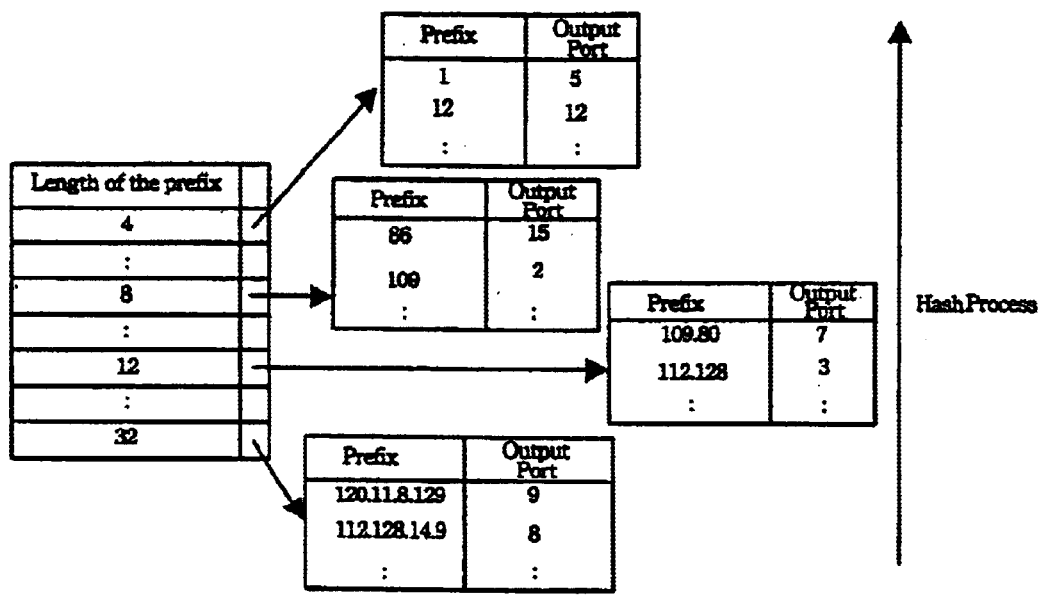
FIG. 1 is a diagram indicating a method of a conventional IP routing lookups.
Figure 2:
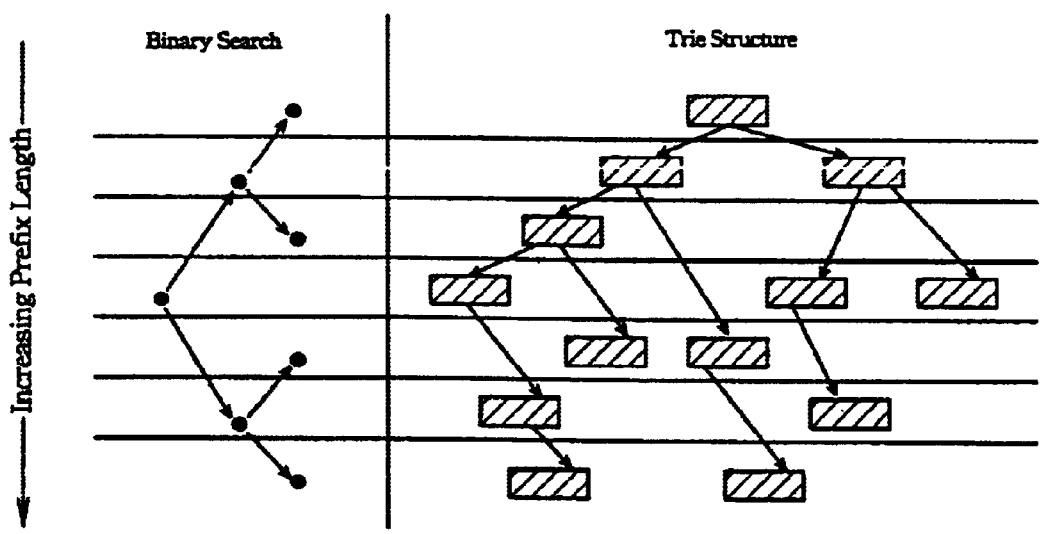
FIG. 2 is a diagram indicating a method for binary search on a Trie in a first prior art.
Figure 3:
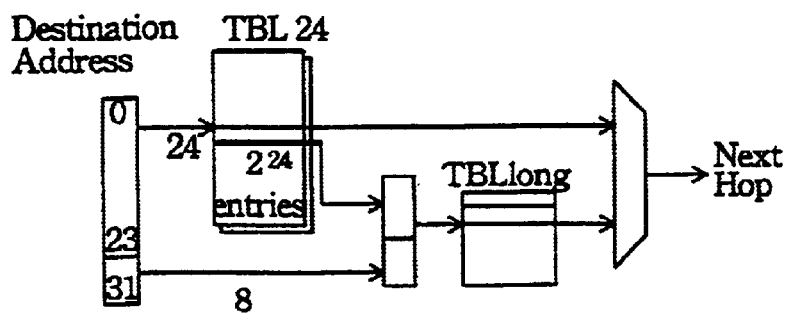
FIG. 3 is a diagram indicating a method for speeding up the lookups for IP routing by accessing memory in hardware in a second prior art.
Figure 4:
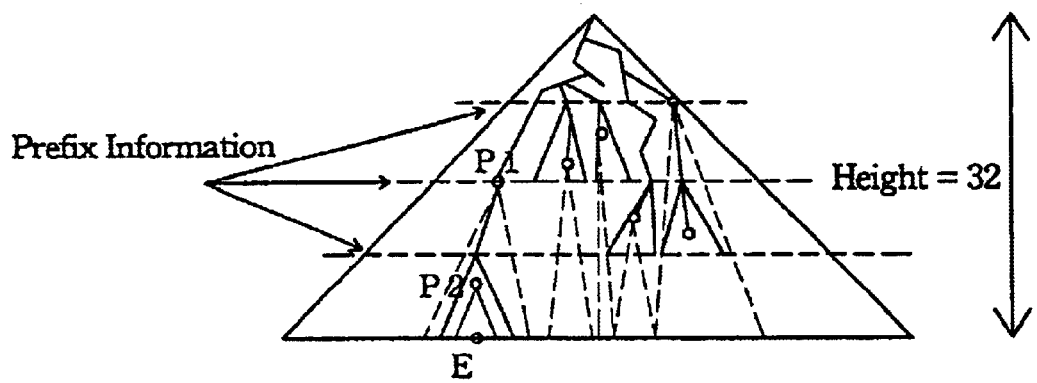
FIG. 4 is a diagram illustrating the tree expanded with prefixes entries.

The basic concept is to expand the routing table on a Trie, where the nodes on the Trie represent the prefix entries in the corresponding routing table that are scattered throughout the Trie according to the lengths of the prefixes. This invention defines the level of a node by initially letting the root be at level 0. The height or depth of a tree is the maximum level of any node in the tree. To quickly identify the approximate location of the entry and the output port for the destination address, the present scheme partitions the routing Trie into segments. Namely, the scheme shrinks the range to be searched from the Trie with a height of 32 to a subtree with a height of 8 or 16. In the subtree, the output port of the BMP can be found. The scheme is illustrated in FIG. 4.

The data structures used contain prefix information indicating the routing direction and the associated segment, and lookup tables providing the output port corresponding to the IP address in an associated subtree. Only when there are over two different output ports in the associated subtree, will the lookup table need to exist. When there is just one output port in the associated subtree, the information of the single output port in the associated subtree is attached to a corresponding entry in the prefix information table. Thus, the size of the forwarding table is considerably reduced, and the scheme retains the advantages of the binary search used in prior art. There is no need to save the prefix information for each level on the Trie, and therefore significantly reduces the complexity of updating, facilitates the updating of the forwarding table, and reduces the overload.

Figure 5:
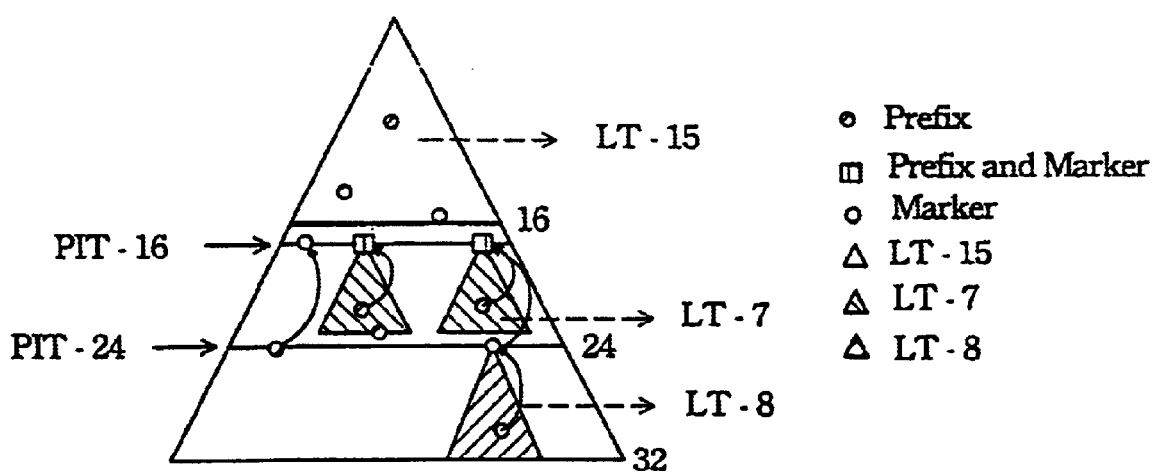
FIG. 5 is a diagram illustrating the prefixes-expanding tree with three major segments according to the present invention.

For the current routers, many routing prefixes are stored in the database of the routers. In the present invention, the Trie with prefixes as nodes are segmented into three regions: level 0–16, level 17–24, and level 25–32, as is shown in FIG. 5. Two data structures are used for the proposed scheme, and they are Prefix Information Table (PIT) and lookup table (LT), respectively. The PIT contains the prefix information and provides information to guide the binary search for the BMP. In the Trie, there are two PITs located on level 16 and level 24, respectively. The lookup table provides the associated output ports corresponding to the associated subtree.

The Prefix Information Table and the lookup table will be described in more detail as follows:

Prefix Information Table

As discussed earlier, the Trie is segmented into three regions: level 0–16, level 17–24, and level 25–32. Two PITs, one at level 16(PIT-16) and the other at level 24(PIT-24), are also constructed to aid the lookup process. For example, the first 16 bits of the prefixes with their lengths longer than or equal to 16 are taken and stored in PIT-16. The information of a PIT-16 format comprises a 16-bit entry number identification, a 1-bit prefix identification, a 1-bit direction identification, and a 14-bit pointer. To facilitate the lookup process, the entries on the Trie can be sorted into tree:

(1) Pure Prefix (X): The entry itself is a prefix and there are no other nodes on the Trie that belong to the subtree expanded from the entry itself as a root. In the case, P=1, I=0, and Ptr has the value of the output port that the packet should be sent to get to its next hop.

(2) Pure marker (M): The entry is created by one or more nodes on the Trie that belong to the subtree expanded from the entry itself as a root. The entry itself is not a prefix. For the PIT-16, the value of the entry is obtained by taking the first 16 bits from the prefix In this case, P=0, I=1, and Ptr points to the associated Lookup Table (as will be discussed below).

(3) Prefix and Marker (XM): The entry itself is a prefix and there are other nodes on the Trie that belong to the subtree expanded from the entry itself as a root. For the PIT-16, the value of the entry is obtained by taking the first 16 bits from the prefix. In this case, P=1, I=1, and Ptr points to the associated Lookup Table.

It is noted that an entry in PIT-16 indicates that there exists at least one node in the subtree with the entry itself as a root down to the leaves (level 32) of the Trie. Multiple nodes on the subtree can be represented by a single entry in the PIT-16. This is the same as applied to the PIT-24.

When I=0 in the PIT entry, the marker indicates the information of the output port. If I=1 in the PIT entry, there exists possibly longer matching prefix. There is, then, a need to search for the best matching prefix on the next step by referring to the Ptr. The value of P indicates whether the entry is a prefix. If P=1, the entry is a prefix. On the contrary, P=0 indicates the entry is not a prefix, but a marker.

The establishment of the PIT-24 is just the same as that of the PIT-16. But the prefix information the PIT-24 stores is the prefixes with lengths longer than or equal to 24 bits. The first 24 bits of the prefixes are stored in the PIT-24. The information of a PIT-24 format comprises a 24-bit entry number identification, a 1-bit prefix identification, a 1-bit direction identification, and a 14-bit pointer. The entries on the Trie can be sorted into tree:

(1) Pure Prefix (X): The entries are prefixes provided with 24 bits. The entry itself is a prefix and there are no other nodes on the Trie that belong to the subtree expanded from the entry itself as a root. In the case, P=1, I=0, and Ptr has the value of the output port that the packet should be sent to get to its next hop.

(2) Pure marker (M): The entries are prefixes provided with longer than 24 bits. The entry is created by one or more nodes on the Trie that belong to the subtree expanded from the entry itself as a root. The entry itself is not a prefix. For the PIT-24, the value of the entry is obtained by taking the first 24 bits from the prefix. In this case, P=0, I=1, and Ptr points to the associated Lookup tables (as will be discussed below).

(3) Prefix and Marker (XM): The entries are prefixes provided with 24 bits or longer than 24 bits. The entry itself is a prefix and there are other nodes on the Trie that belong to the subtree expanded from the entry itself as a root. For the PIT-24, the value of the entry is obtained by taking the first 24 bits from the prefix. In this case, P=1, I=1, and Ptr points to the associated Lookup Tables.

Figures 6A, 6B, 7:
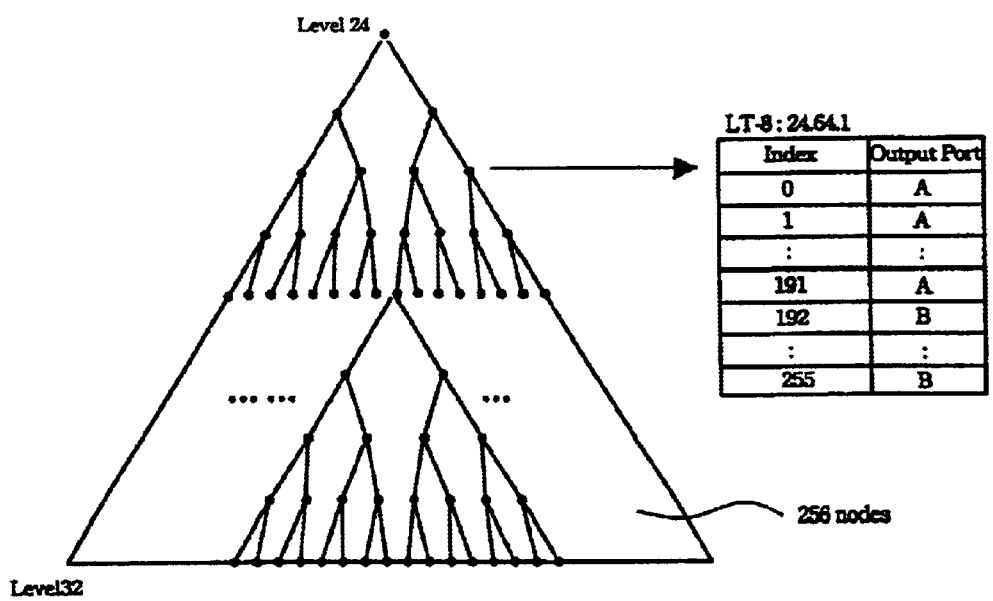
FIG. 6A is the format of the Prefix Information Table (PIT) when I=0, according to the present invention.
FIG. 6B is the format of the Prefix Information Table (PIT) when I=1, according to the present invention.
FIG. 7 is a diagram illustrating the mapping from a subtree spanning from the node 24.64.1 to the LT-8 (24)

The PIT format is given as FIG. 6A for the case I=0, and FIG. 6B for the case I=1. When searching for an prefix entry in a PIT, hash process is needed.

Lookup Table

In the preferred embodiment according to the present invention, there are three types of Lookup Tables as shown in FIG. 5. In the Lookup Tables LT-i(j), i is the height of the table corresponding to the subtree, and j is the level of the root of the subtree. Lookup Tables (LTs) provide a mapping between the subtree and the output port. The three types of the LTs are:

1. LT-15(0): LT-15 contains all possible mapping of the entries to the output ports from level 0 to 15. Namely, all lookup information in the top segment in FIG. 5 is included in a LT-15(0). As a trade-off between the lookup speed and the memory usage, making the complete tree available reduce the lookup time with a modest increase of the memory usage.

2. LT-7(16): It is an LT pointed to by an entry in PIT-16. The entries of the LT consist of the leaves at the fully expanded subtree of height 7 and provide a mapping between the leaf nodes and their output ports. Namely, all lookup information in the middle segment in FIG. 5 is included in several LT-7(16). It has 128 ($2^7$) entries.

3. LT-8(24): It is an LT pointed to by an entry in PIT-24. The entries of the LT consist of the leaf nodes at the fully expanded subtree of height 8 and provide a mapping between the leaf nodes and their output ports. Namely, all lookup information in the bottom segment in FIG. 5 is included in several LT-8(24). It has 256 ($2^8$) entries.

Referring to FIG. 7, which depicts the mapping between the complete binary subtree expanded from the node corresponding to the prefix 24.64.1 and the corresponding LT-8, which can be seen in FIG. 7, wherein all the prefixes from the 24.64.1.0 to 24.64.1.191 correspond to the output port A, while ones from the 24.64.1.192 to 24.64.1.255 correspond to the output port B.

The steps of the proposed IP lookup includes:

When a packet arrives, the destination address carried by the packet is extracted and the following procedures are followed:

Take the first 16 bits of the destination (DA). Then a hash process is launched for the 16 bits in the PIT-16. If no math is found, then the lookup should go back to the LT-15(0) since the number of the bits must be less then 16. Take the first 15 bits of the DA as an index into LT-15(0). The output port can be found through the LT-15(0). Exit.

If a match is found in the PIT-16 for the first 16 bits of the DA, then look at the value of the I corresponding to the matched entry. If I=0, then BMP is found. Exit.

If I=1, the lookup must proceed since BMP is not yet found. At the time, the first 24 bits of the DA is extracted and the 24 bits of address is hashed into the PIT-24. If no match is found, the BMP must locate in the middle segment of FIG. 5; namely, the longest matching fraction of the DA locates in the 16–23 bits of the DA. The lookup must continue back to the LT-7(16) the Ptr points to in the PIT-16. The 16–22 bits of the DA is then extracted as an index into the LT-7(16) to find the exact output port. Exit.

If a match is happened, then the bit number of the DA is longer than or equal to 24 bits is known. Then look at the value of the I corresponding to the matched prefix entry. If I=0, then the BMP is found. The Ptr shows the output port.

If I=1, the lookup must proceed since BMP is not yet found. The location of the BMP is in the bottom segment of FIG. 5; namely, the longest matching fraction of the DA locates in the 24–32 bits. The lookup must continue to the LT-8(24), pointed to by the Ptr points to, corresponding to the PIT-24. The 23–32 bits of the DA is extracted as an index into the LT-8(24) to find the exact output port Exit.

The description of the above-mentioned access for the IP lookup according to the scheme proposed by the present invention can be formulated by the following algorithm:

```
Function LookupSearch(DA) (*search for address DA*)
    Extract the first 16 bits of DA into DA__16;
    M__16:=Search(DA__16,PIT-16.hash); (*search hash for DA__16*)
    If M__16 is not nil and M__16.I=0 Then
        BMP__OutputPort:=M__16.Ptr;
    Elseif M__16 is not nil and M__16.I=1 Then
        Extract the first 24 bits of DA into DA__24;
```

-continued

```
    M_24:=Search(DA_24,PIT_24.hash);
    If M_24 is not nil and M_24.Ptr is an output port Then
        BMP_OutputPOrt:=M_24.Ptr;
    Elseif M_24 is not nil and N_24.Ptr is not an output port Then
        Extract bits 24–31 of the DA into DA_8;
        BMP_OutputPort:=LT-8[M_24.Ptr][DA_8];
    Else (*M_24 is nil*)
        If M_16.Ptr is an output port Then
            BMP_OutputPort:=M_16.Ptr;
        Else
            Extract bits 16–22 of DA into DA_7;
            BMP_OutputPort:=LT-7[M_16.Ptr][DA_7];
        Endif
    Endif
Else (*M_16 is nil*)
    Extract the first 15 bits of DA into DA_15;
    BMP_OutputPort:=LT-15[DA_15];
```

Hash processes are used through the lookup scheme as proposed above. There may happen to collisions during a hash process. When collisions happen, one or more than one memory access is needed. To prevent this from occurring, the PIT-16 is expanded to a full table in place of the hash table in an attempt to reduce the hash processes as least as possible. In the worst case according to the above method for processing the IP routing, the PIT-16 is first looked through, and a match is found but I=1. Then the lookup proceeds with a hash process in the PIT-24. If no output port for the DA is found, looking up through LT-7(16) or LT-8(24) is needed. In the case, a hash process and 2 memory accesses are necessary for the output port.

Figure 8:
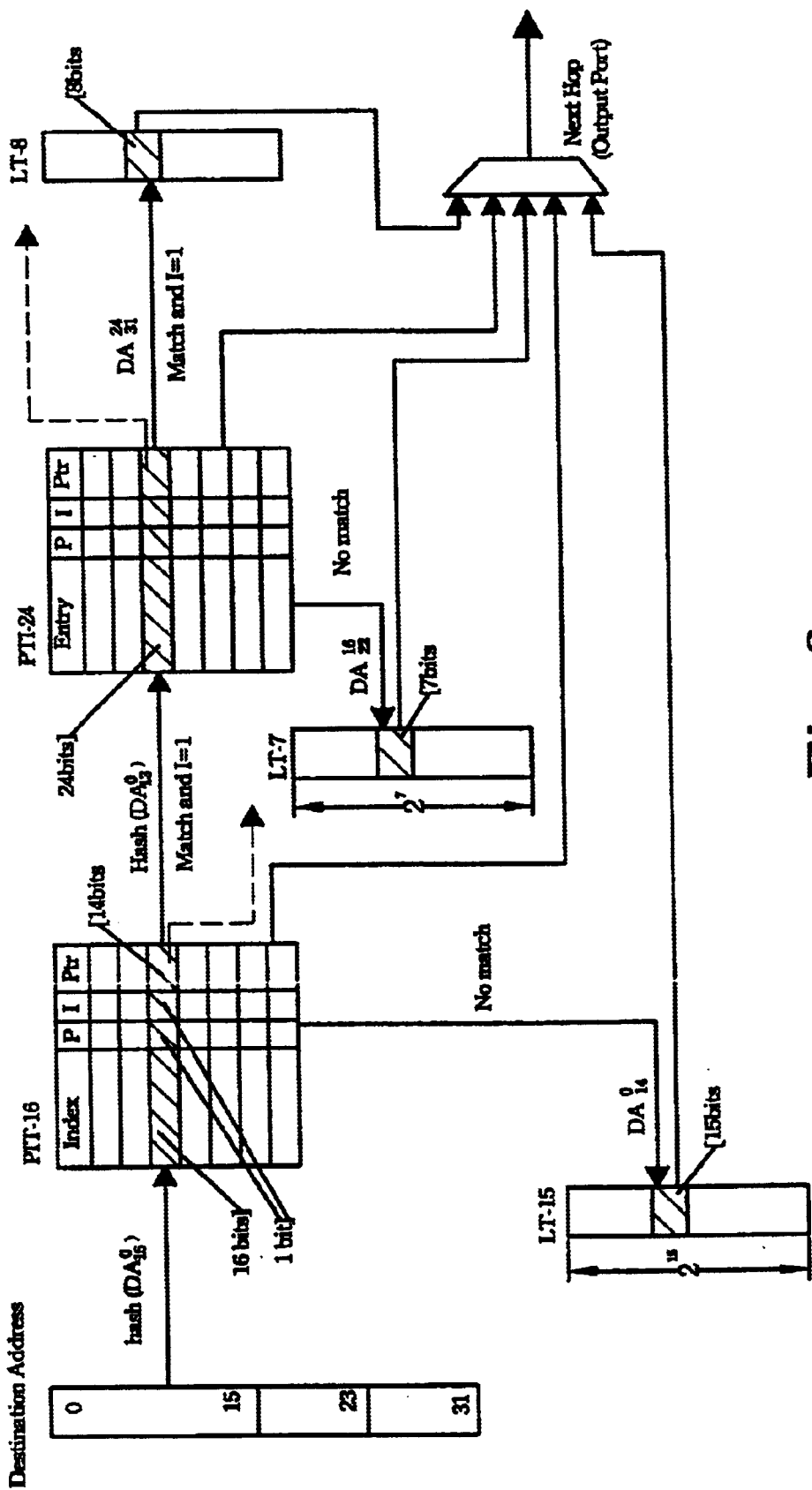
FIG. 8 is a diagram illustrating the proposed IP lookups scheme and the hardware realization of the same.

To facilitate the study of the method for the lookup process according to the present invention, FIG. 8 is drawn to illustrate.

Figure 9:
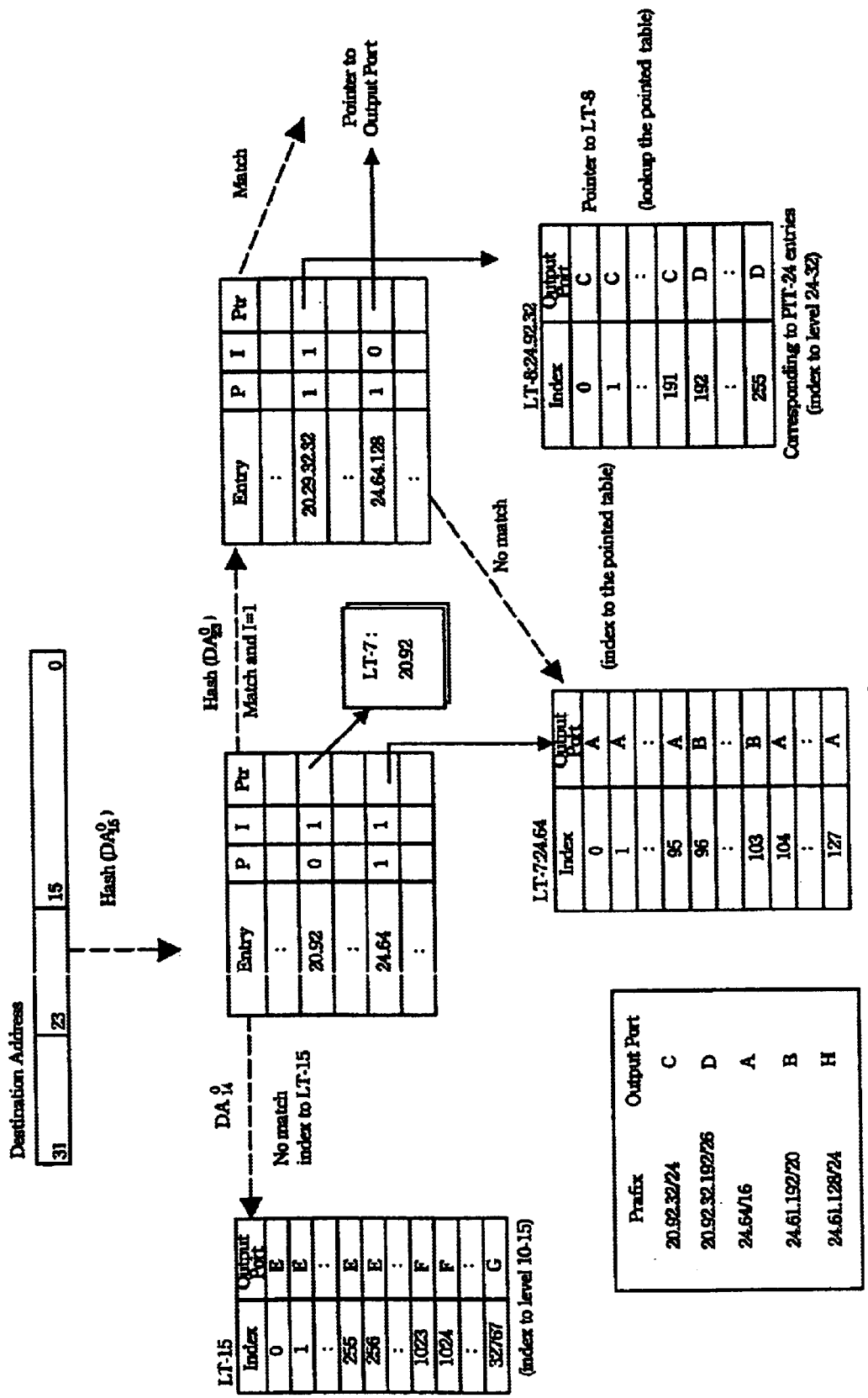
FIG. 9 is a diagram illustrating a practical example for the proposed IP lookups scheme.

A practical example for the proposed IP lookups scheme is illustrated in FIG. 9 and described as follows:

Suppose that the following entries are in the examplary routing table shown in FIG. 9: 20.92.32/24, 20.92.32.192/26, 26.64/16, 24.64.192/20, 24.64.128/24, where the number after the "/" sign presents the bit length of the prefix corresponding to the entry. The routing table entries create two entries in PIT=16: one is "20.92" with P=0 and I=1 (created by the first two routing table entries), the other one is "24.64" with P=1 and I=1. The Ptr field of the entry "24.64" is a pointer to the LT-7(16), which all entries from 96 to 103 all store the same output B (Although the Ptr field of the entry "20.92" also points to another LT-7(16), the detail is not shown for the sake of presentation). Similarly, the routing table entries also results in two entries in PIT-24: one is "20.92.32" (created by 20.92.32/24 and 20.92.32.192/26) with P=1, I=1 and another entry "24.64.128" with P=1 and I=0. The Ptr field of the entry "20.92.32" points to the LT-8(24), which all entries from 192 to 255 all store the value of the output port D.

When a packet arrives at the router, the DA of the packet is first extracted. Assume that the value of the DA is 20.92.32.194. Take the first 16 bits of the A ("20.92") as an index for PIT-16 and find that the entry is non-empty and the value of I is 1, meaning that although this is a match, there might exist a longer prefix that matches the DA. In this case, take the first 24 bits of the DA as a prefix and hash into the PIT-24. It turns out that the entry "20.92.32" has a match, the value of I=1, and the Ptr points to the LT-8, meaning that there might be a longer prefix that matches the DA. The bits 24 to 31 (the value is "194") of the DA are used as an index into the LT-8(24) and locate the corresponding output port. It can be found that the output port is D.

If another packet arrives in the router, the first 16 bits "24.64" is used as an index into the PIT-16. The corresponding entry is non-empty with I=1, meaning that there might be a better BMP down at a lower level. Therefore, PIT-24 is visited by taking the first 24 bits of the DA as a key for hashing. This time, the hash fails (meaning that the BMP should not be of level 24 or below). Consequently, the BMP entry should be of a length between 16 and 23. As a result, the Ptr field of the previously located PIT-16 entry is used to get to the LT-7(16) corresponding to the "24.64" entry. Take the bits 16 to 24 of the DA "97" as an index into the LT-7(16), the output port B is obtained.

Assume another packet with the DA "24.64.128.154" enters the router, the first 16 bits of the DA "24.64" is processed to index to the PIT-16. In the PIT-16, there exists an entry "24.64", and the value of I of that entry is 1. The hash through the PIT-24 is needed, and the first 24 bits of the DA is extracted to do the hash. As a result, the entry "24.64.128" is found and I=0. The BMP is found to be "24.64.128", and the output port H is known through the Ptr.

The present invention can be further called for upon the future IPv6 with the concept set forth above to access lookup for IP addresses. The establishment of the scheme for the IPv6 is described as follows:

The Trie with prefixes as nodes are segmented into i sections. The Prefix Information Tables are established as PIT-$m_1$, PIT-$m_2$, PIT-$m_3$, . . . , PIT-$m_i$, as the format on the Trie for the router in IPv4. DA is hashed in a given PIT-$m_j$ (1<j<i). According to I and P, either the PIT the BMP locates in is found with the approach analogy to the one used in IPv4, or a given lookup table is checked through, unless the BMP and the output port are obtained. In a PIT-$m_j$ format, there are at least 4 types of information: entry number for $m_i$ bits, direction identification for 1 bit, prefix identification for 1 bit, and Ptr for 14 bits.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for speeding up an Internet Protocol (IP) address lookup with efficient use of memory, comprises:
    establishing a first Prefix Information Table (PIT) corresponding to the leaf nodes on the m-th level on a Trie, and a second PIT corresponding to all the leaf nodes on the n-th level on said Trie for partitioning said Trie into t segments to map all routing entries in the original routing table;
    looking up a Best Matching Prefix (BMP) for said IP address through said first PIT and said second PIT for finding an output port corresponding to said IP address or for finding an Lookup Table (LT) corresponding to said IP address; and
    checking up said LT for finding a BMP, and an exact output port is obtained, wherein the first PIT comprises an m-bit entry number identification field, a 1-bit direction identification field, a 1-bit prefix identification field, and a 14-bit pointer field; and the second PIT comprises an n-bit entry number identification field, a 1-bit direction identification field, a 1-bit prefix identification field, and a 14-bit pointer field.

2. The method for speeding up an IP address lookup with efficient use of memory according to claim 1, wherein m is 16, n is 24, and t=3.

3. A method for speeding up an Internet Protocol (IP) address lookup with efficient use of memory, comprises:

establishing a plurality of Prefix Information Tables (PITs), including $1^{st}$ PIT, $2^{nd}$ PIT, ..., j-th PIT, ..., n-l-th PIT and n-th PIT;

looking up said IP address through said plurality of PITs, until an exact match or an LT corresponding to said IP address is found; and checking up said LT for finding a best matching prefix (BMP), and an exact output port is obtained, wherein said j-th PIT comprises an $m_j$-bit entry number identification field, a 1-bit direction identification field, a 1-bit prefix identification field, and a 14-bit pointer field.

* * * * *